United States Patent [19]
Haartsen

[11] Patent Number: 6,028,853
[45] Date of Patent: Feb. 22, 2000

[54] METHOD AND ARRANGEMENT FOR RADIO COMMUNICATION

[75] Inventor: Jacobus Haartsen, Staffanstorp, Sweden

[73] Assignee: Telefonaktiebolaget LM Ericsson, Stockholm, Sweden

[21] Appl. No.: 08/870,493

[22] Filed: Jun. 6, 1997

[30] Foreign Application Priority Data

Jun. 7, 1996 [SE] Sweden .................. 9602270

[51] Int. Cl.⁷ .................. H04J 3/06; H04J 3/12; H04B 7/212
[52] U.S. Cl. .................. 370/338; 370/520; 370/350; 375/356; 455/502
[58] Field of Search .................. 370/337, 350, 370/312, 475, 509, 522, 280, 347, 514, 524, 395; 375/309, 356, 220; 455/502, 503, 439; 340/525.21

[56] References Cited

U.S. PATENT DOCUMENTS

| | | | |
|---|---|---|---|
| 4,513,415 | 4/1985 | Martinez | 370/312 |
| 5,124,698 | 6/1992 | Mustonen | 340/825.21 |
| 5,285,443 | 2/1994 | Patsiokas et al. | 370/337 |
| 5,293,380 | 3/1994 | Kondo | 370/350 |
| 5,479,409 | 12/1995 | Dupuy et al. | 455/439 |
| 5,506,867 | 4/1996 | Kotzin et al. | 375/220 |
| 5,771,462 | 6/1998 | Olsen | 455/524 |

FOREIGN PATENT DOCUMENTS

| | | |
|---|---|---|
| 0 666 677A2 | 8/1995 | European Pat. Off. . |
| 91/03136 | 3/1991 | WIPO . |
| 94/28643 | 12/1994 | WIPO . |

*Primary Examiner*—Alpus H. Hsu
*Assistant Examiner*—Afsar M. Qureshi
*Attorney, Agent, or Firm*—Burns, Doane, Swecker & Mathis, L.L.P.

[57] ABSTRACT

The present invention relates to a method and arrangement in an ad-hoc network for synchronizing a multiple of radio transceiver arrangements with different characteristics that make use of a common air interface. Each transceiver arrangement comprises at least two transceivers which mutually communicate via a radio transmission link. All transceivers synchronize to a common synchronization signal comprising two staggered beacon pulse series signals ($TX_1$, $TX_2$) which have the same repetition rate. The transceivers synchronize their internal timers which control the signal transmission from the transceivers, to the strongest one of the two beacon pulse series signals ($TX_1$, $TX_2$) by listening during one of the corresponding sets of time windows ($RX_1$, $RX_2$). Between the reception of two beacon pulses, each transceiver transmits beacon pulses itself, thus contributing to the generation of the other beacon pulse series signal, on which other transceivers can lock.

34 Claims, 7 Drawing Sheets

METHOD AND ARRANGEMENT FOR RADIO COMMUNICATION

TECHNICAL FIELD OF THE INVENTION

The present invention relates to a method and an arrangement for synchronization of radio transceivers that make use of a common air interface. In addition, a method for obtaining orthogonal traffic channels is presented.

DESCRIPTION OF PRIOR ART AND BACKGROUND OF THE INVENTION

Many wireless systems today apply burst transmission; short, repetitive bursts are used to carry the information from transmitter to receiver. An advantage of burst transmission is that the transmit and receive circuitry only has to operate during the presence of the burst. In between the bursts the transceiver can be put in standby mode, thus saving power. This is in contrast to continuous wave (CW) modulation like FM or spread-spectrum transmission where the transceiver has to operate continuously. Burst transmission is therefore attractive in battery driven, portable devices where power consumption is of crucial importance.

Current cellular systems like GSM (Global System for Mobile Communication) and D-AMPS (Digital Advanced Mobile Phone System) and office communication systems like DECT (Digital European Cordless Telecommunications), are built to provide multiple user access on a common air interface by applying TDMA (Time Division Multiple Access). The time is divided into time slots which represent the channels. Each user has its own time slot or set of time slots. However, to avoid interference, time slots should be strictly separated and no overlap may occur. This requires accurate synchronization of the transceivers that are part of the TDMA network.

A further example of a system which uses some kind of time slots in the transmission protocol is FH-CDMA (frequency-hopping code-division multiple access), in which the frequency spectrum is divided into a large number of frequency bands, so called hop channels. Each transceiver is instructed to jump from hop channel to hop channel according to a unique hopping sequence. Different links should use different hopping sequences which are mutually orthogonal, so that if a user occupies one hop channel, no other user occupies this hop channel at the same time. In order to keep the hopping sequences orthogonal, time synchronization of the transceivers is required.

In all existing wireless slotted radio communication systems the method for synchronization is based on an internal clock timer in a central station, to which all other stations in the system adjust their internal timers. In mobile telephony systems like GSM, the base stations transmit fixed synchronization signals, also called beacon (broadcast control) signals, to which all mobile transceivers can synchronize. By appropriate channel allocation, each user gets its own time slot and the channels remain orthogonal.

Wireless systems in which no central synchronization or control exists are typically applied in private, short-range communications, and preferably make use of unlicensed frequency bands such as the ISM (Industrial, Scientific, Medical) band. In the literature such clusters of independent transceivers which share the same air interface without the supervision of a master control unit are known as ad-hoc networks. Transceivers can communicate with each other on a point-to-point or point-to-multipoint basis but have very little knowledge or no knowledge whatsoever of the communications between other transceiver arrangements. However, all transceivers do make use of the same common air interface. As a result, there is a contention problem; without synchronization, links will mutually interfere if their burst transmission overlaps in time and collisions occur. Typical examples of wireless connections in an ad-hoc network are wireless links between computers and local area networks (LAN), and wireless connections between fixed, mobile or portable phones and their peripherals. Examples of the latter are laptop-phone or phone-headset connections.

To deal with the collision problems, communication protocols have been developed that apply retransmission. If a burst is not received correctly, the transmitter retransmits the same information. This procedure is repeated until the receiver acknowledges the correct reception. A frequently used protocol working according to this procedure is the ALOHA protocol. Retransmission protocols are popular in packet radio systems, where the information is arranged in data packages each having an address and an order number. If, due to a collision, a data package is lost, it is retransmitted later on and can be inserted into the package series due to its unique order number.

The ALOHA protocol works well as long as the number of users is much smaller than the number of channels. Then the probability of a collision is small and both the throughput and delay per link remain acceptable. In combination with the ALOHA protocol, it is nowadays common practice to use collision avoidance methods. In this case, the transceiver first listens to a particular channel before it transmits. If the transceiver measures activity, it waits an arbitrary period of time and then listens again until no activity is observed. Then the transceiver starts the transmission. This technique, often referred to as CSMA (Carrier Sense Multiple Access), reduces the number of collisions, that can still occur due to delay differences.

Another variant of the ALOHA protocol is called slotted ALOHA. In slotted ALOHA systems, the time scale is divided into intervals of equal lengths. Every user wishing to transmit has to synchronize its transmission so that it starts at the beginning of an interval. It can be shown that the throughput of a slotted ALOHA system, under certain conditions on the traffic intensity, is twice as high as the maximum throughput of a pure ALOHA system. The importance of a proper synchronization of the individual transceivers for this slotted ALOHA system is apparent.

For applications in which the links can transfer data and/or speech, packet radio techniques and ALOHA protocols are not attractive. Speech communication does not have the same properties as data communication has, i.e., it is continuous, delay sensitive, and speech samples must be received in the right order (within a reasonable delay window). Retransmissions are impossible since it would give an accumulated delay at the receiver, which means that the error rate on the speech link must remain acceptably low. Therefore, the collision probability must be low, which is only accomplished when the number of users is much smaller than the number of channels. Therefore, the number of users that can use the common air interface is rather limited. Even then, problems may arise if the burst repetition rates of two users drift towards each other, giving continuous collisions during a certain period until the bursts have drifted from each other again. Without synchronization, therefore, a certain degree of interference due to mutual drift is inescapable.

For the applications mentioned above, where we have links carrying speech, data, or both, without a common master control, there is a strong request to keep the channels orthogonal. This requires synchronization between the transceivers that share the common air interface. In addition, consistent channel allocation should be applied to avoid two users accessing the same channel.

The patent publication U.S. Pat. No. 5,285,443 describes a method for synchronization of multiple base stations for cordless telephony within a defined geographical area. One of the base stations is configured as a master station and the remaining base stations are configured as slave stations. The master station transmits a synchronization signal to which the slave stations synchronize. In case the synchronization signal from the master station is missing, one of the slave stations will change from slave mode to master mode and start to transmit a synchronization signal to which the other base stations can synchronize. The described synchronization procedure thus synchronizes the base stations; the cordless telephones, with which the base stations communicate by applying TDD (Time Division Duplex), must separately be synchronized by the base stations. Problems with interference can easily occur with this synchronization technique at the borders of the synchronization area. Transmissions from transceivers located in the periphery of the area in which the synchronization signal can be received, can be received from transceivers outside this synchronization area and thereby cause interference. These peripheral transceivers are for the same reasons also vulnerable for interference. Hence, this synchronization technique requires careful planning not to cause interference problems.

The patent publication U.S. Pat. No. 5,124,698 describes a method for synchronization of base stations in a paging network. A first master base station transmits a synchronization message to at least one neighbour base station. This base station reads the synchronization message, uses the received information for synchronization, and transmits a new synchronization message that other base stations can use for synchronization. This procedure is repeated following a predetermined route until all base station are synchronized. Hereby, the base stations use information from only one other base station each for synchronization. The described synchronization method of the base stations requires a detailed route planning. The method is thus only applicable for static systems without central control.

SUMMARY OF THE INVENTION

As described above, it is for several reasons desirable to synchronize the radio transceivers in a telecommunication network in which information is to be transmitted on a plurality of radio traffic channels. It is also desirable that the synchronization does not require extra transmitters or a dedicated central control station. It is further a desire to be able to transmit information of different nature, such as speech and data with varying degrees of delay sensitivity, sensitivity for intermittent interruptions in the transmission, and transmission rate between the transceivers in a radio communication system. A particular desire in such a case is that the transmission of information between transceivers shall effectively utilize available radio channels and transmission capacity. In radio communication networks of the kind in question, it has so far been a problem to simultaneously satisfy these desires.

The problems mentioned above are solved in the present invention by synchronizing each transceiver to a common synchronization signal which is generated by the transceivers. The transceivers are arranged to form transceiver arrangements wherein each transceiver arrangement comprises two or more transceivers communicating via a radio link.

The synchronization signal to which the transceivers synchronize is preferably composed of at least two beacon pulse series signals, each having the same repetition rate. The transceiver synchronizes to one of the beacon pulse series signals, whereupon each transceiver arrangement contributes to the generation of at least one of the other beacon pulse series signals by transmitting beacon pulses. Beacon pulses from individual transceivers superpose so that they form beacon pulse series signals which together constitute the synchronization signal. The beacon pulse series signal on which an individual transceiver locks, can preferably be the beacon pulse series signal whose signal strength at the receiver of the transceiver is the highest. By these means, the transceivers will always contribute to the weaker beacon pulse series signals. With a large number of transceivers this will ensure that the signal strengths on the pulse series signals are about equal.

In essence, only one transceiver in every transceiver arrangement forming one link has to contribute to the synchronization signal. This will preferably be the unit with the lowest power consumption requirements. The other unit may contribute, but it is not necessary and not desirable if the unit has a low power capacity like a Personal Digital Assistant (PDA) or a cordless headset.

One object of the present invention is to create a method and arrangement for radio communication for synchronization of multiple transceiver arrangements with different characteristics.

Another object of the present invention is to create a method and arrangement for radio communication which will enable synchronization of the timers of the transceivers without requiring any extra transmitters or external control.

A still further object of the present invention is to create a method and arrangement for radio communication which will enable synchronization of transceiver arrangements and transmission of information such that available radio channels and transmission capacity are utilized effectively.

A still further object of the present invention is to create a method and arrangement for radio communication which will enable synchronization of stationary and/or mobile transceivers without a central control.

An important advantage of the current invention is the creation of a method and arrangement for radio communication synchronization which will enable the creation of an adequate channel allocation for orthogonal radio links. Especially advantageous is that the channel allocation can be applicable for transceiver arrangements with different characteristics.

Another advantage of the present invention is the creation of a method and arrangement for radio communication synchronization which will enable synchronization of a multiple of communication links without causing unacceptable interruptions in interruption sensitive information.

The invention will herein be further explained by means of embodiments with reference to the accompanying drawings.

DETAILED DESCRIPTION OF EMBODIMENTS

Figure 1:
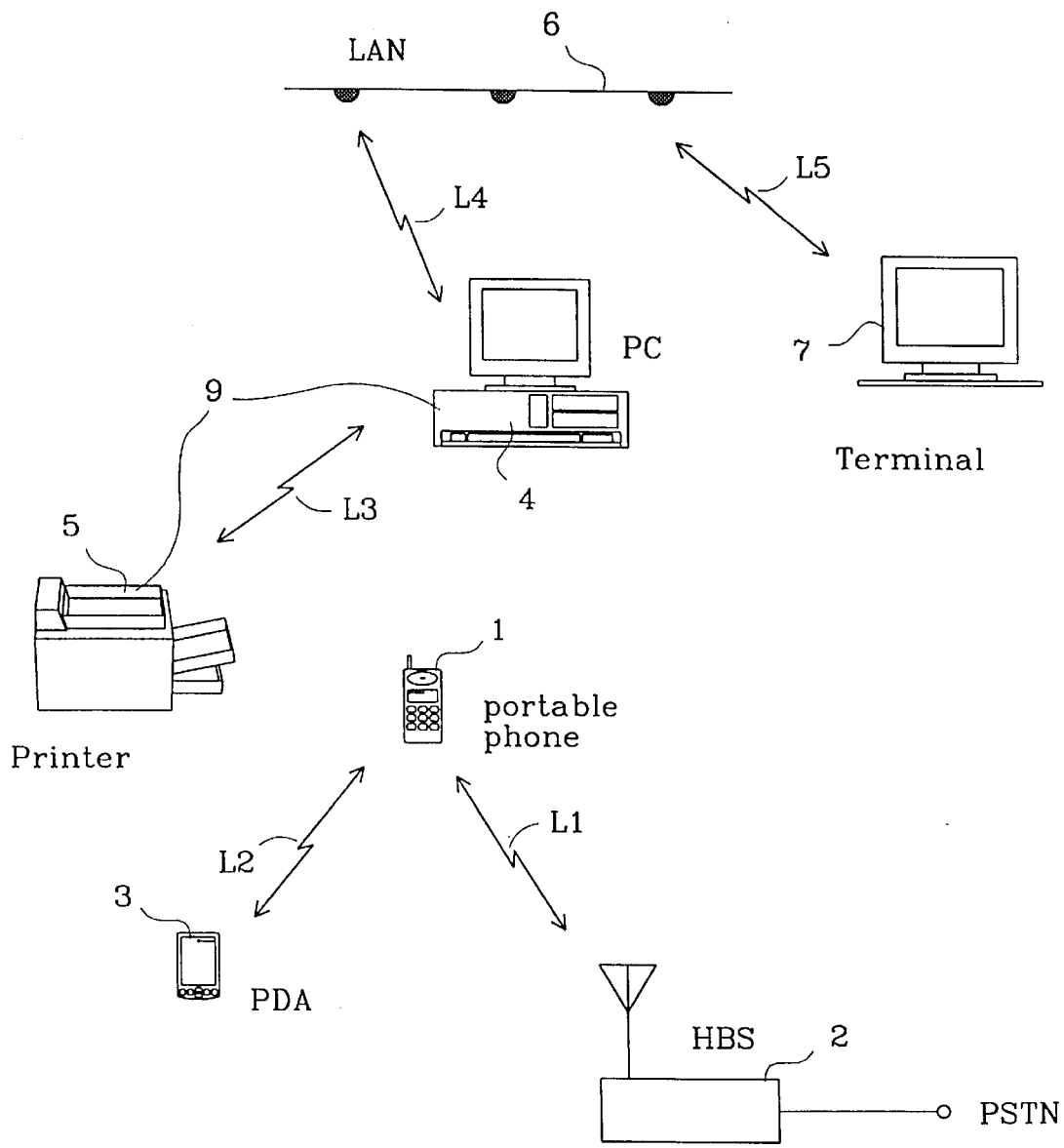
In FIG. 1 a view is shown, illustrating an example of an application environment with transceivers without a central synchronization or control.

An environment in which the current invention is typically used, is shown in FIG. 1. A number of transceiver arrangements communicating over short-range links L1, . . . , L5 with different characteristics without external synchronization or control share a limited space and a common air interface. Such a cluster of transceivers can be regarded to form an ad-hoc network.

A portable phone 1 is alternately communicating with a home base station (HBS) 2, which is connected to a public telephone network over a PSTN (Public Switched Telephone Network) connection, and to a PDA (Personal Digital Assistant) 3. The communication takes place on two point-to-point links L1 and L2 transferring speech and data on an, in this example, unlicensed band. Sharing the same air interface, there is another transceiver arrangement 9, consisting of a Personal Computer (PC) 4 and a printer 5. The PC has further an analogous wireless connection to a Local Area Network (LAN) 6. On the same air interface the LAN is also connected to a data terminal 7 on the same type of radio link.

Due to the short distances, interference problems arise if the links transmit uncoordinated. Collision avoidance schemes, i.e., measuring in a time window and using that window for transmission if no signal energy is measured, are not sufficient in these applications. First, collision avoidance schemes do not provide long-term orthogonal channels for synchronous connections; due to mutual drift, slots may start to overlap after a while. Furthermore, spectrum may be scarce in these applications which normally make use of unlicensed bands. Then slots must be packed as close as possible to obtain optimal capacity. In addition to collision avoidance during channel allocation, synchronization has to be applied in order to obtain orthogonal channels.

Figure 2:
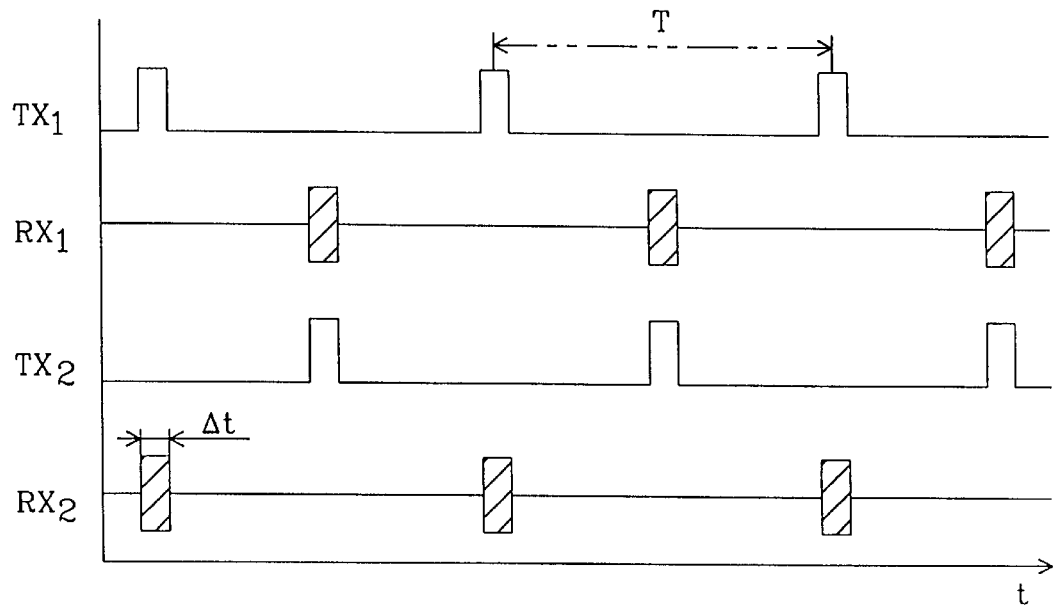
FIG. 2 is a signal diagram illustrating the nature of the synchronization signal.

Since there is no centralized control, there is no central unit that can provide a central synchronization signal to which all users can synchronize. Instead, in the present invention, all users create and contribute to a synchronization signal that has the form of repetitive beacon pulse series. In a preferred embodiment of the invention there are, as illustrated in FIG. 2, two beacon series signals $TX_1$, $TX_2$, staggered at half the beacon period T. Each transceiver locks on one of the beacon series signals $T_1$, $TX_2$ and then contributes to the other. In FIG. 2, $TX_1$ represents the beacon series signal to which a first transceiver contributes; $TX_2$ represents the beacon series signal to which a second transceiver contributes; and $RX_1$, $RX_2$ are two time window series during which said transceivers synchronize to the beacon series signals $TX_2$ and $TX_1$, respectively. The designation t represents the time and $\Delta t$ the duration of a time window in the time window series $RX_1$, $RX_2$. Since the beacon pulses transmitted by each transceiver all add together; and if perfectly locked, they add perfectly since misalignment due to propagation delay can be ignored because of the short ranges; they form one strong beacon signal on which all users can lock and contribute.

In essence, only one unit of a transceiver pair has to contribute to the beacon series signals (herein indicated by the active transceiver). The other, idle unit only has to listen in order to be synchronized. The latter can preferably be the unit with the highest requirements on low power consumption. In fact, the duty cycle of the beacon series signals will be very low to save power both in the active and the idle transceivers. In cases where the transceiver arrangements each involves more than two transceivers in the communication on one single radio connection link, thus forming a transceiver group rather than a transceiver pair, still only one of the transceivers has to actively contribute to the generation of the synchronization signal. All transceivers locked on the same beacon series signal form a synchronous cluster of transceivers.

In a less preferred embodiment of the invention, however, some of the transceiver arrangements may be allowed to passively synchronize, without contributing to the synchronization signal. These transceiver arrangements should preferably first scan for a synchronization signal. If a synchronisation signal is found, the transceiver arrangement will synchronize to it. Only if no synchronisation signal is present, will the transceiver arrangement transmit beacon pulses itself.

Figure 3:
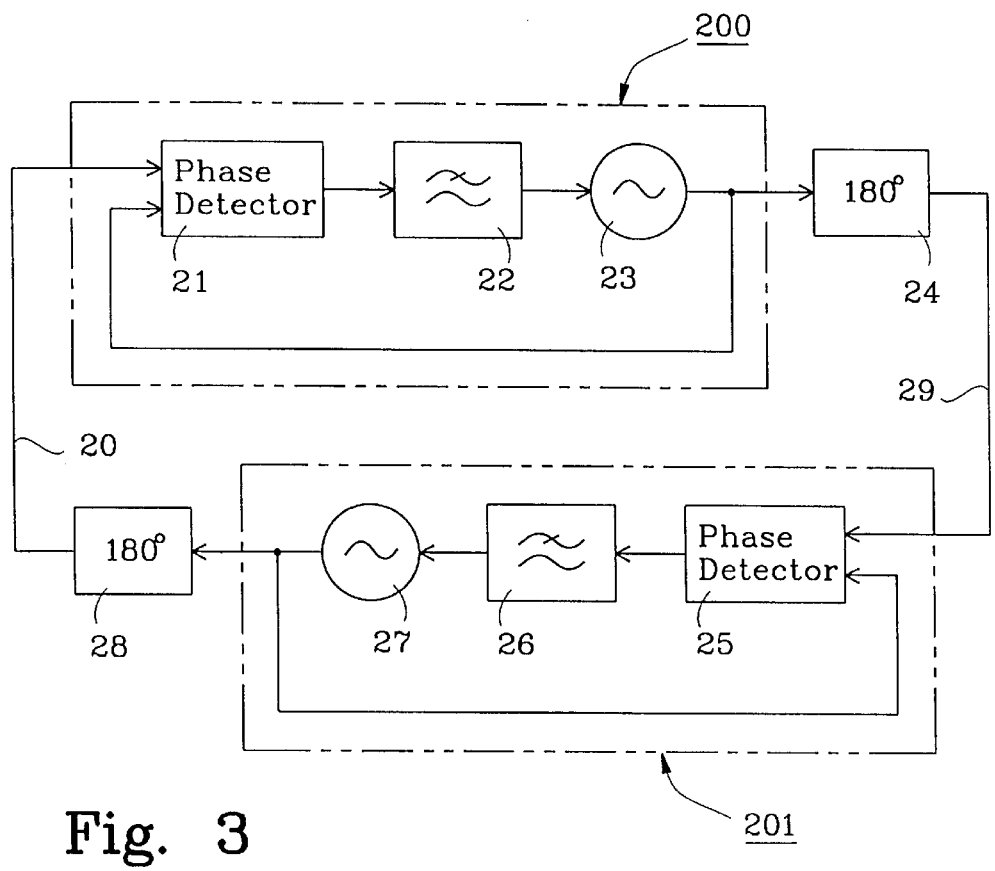
In FIG. 3 is shown a simplified block diagram which illustrates the effect of the synchronization on the transceivers' internal timers.

In the most simple case, we have two transceivers locked on each other. Each transceiver uses some kind of phase locking loop (PLL) circuit to adjust its beacon pulse transmission to its beacon reception. With two transceivers, we have, in essence, two PLL circuits locked on each other as shown in FIG. 3. A first PLL circuit 200 is connected to the output of a first phase shifter 28. The output of the PLL circuit is connected to a second phase shifter 24 whose output is connected to a second PLL circuit 201. The second PLL circuit is then connected to the first phase shifter 28. The PLL circuits 200,201 each comprises a phase detector 21,25, a low-pass filter 22,26 and a VCO (Voltage Controlled Oscillator) 23,27. The PLL circuits adjust the frequency and the phase of the VCOs in accordance with their input signals 20,29 from the phase shifters 28,24.

The phase shifters are simulating the staggering of two beacon pulse series signals, so that the PLL inputs have a phase difference of 180 degrees. It can be shown that the frequency for which the PLL combination stabilises lies somewhere between the rest frequencies of the two VCOs 23 and 27. The rest frequency is the frequency of a VCO when the control signal on the VCO is zero. If the PLL circuits are identical, apart from their rest frequencies, the final frequency will lie exactly in the middle of the two rest frequencies. When more PLL circuits are involved, the final frequency will depend on several factors, e.g., the component values, the relative signal strengths (related to distances), and the individual rest frequencies. However, the final, stable frequency will lie somewhere between the lowest and the highest individual rest frequencies.

Before a new, active transceiver locks on the synchronization signal, it will first scan for beacon pulses. The transceiver will then lock on the strongest beacon pulse series signal, and thus automatically contribute to the generation of the other, staggered and weaker beacon pulse series signal. As a result, the two beacon series signals obtain on average equal signal strengths, and are both suitable to provide synchronization. The selection of the strongest beacon series signal also prevents a transceiver to lock on a transceiver that is temporarily misaligned with the two main beacon series signals. Small perturbations due to noise are averaged out due to the small loop bandwidth of the PLL circuits applied for the beacon lock.

If an active transceiver cannot find a synchronization signal, there is no control signal to the VCO of the PLL circuit, and the VCO will remain at its rest frequency. However, it must transmit in order to create a synchronization signal on which the other party of the link and newly arriving transceivers can lock. When an unlocked transceiver approaches a cluster of synchronized users, several actions to avoid collisions can be taken. In a preferred embodiment, a transceiver that measures nothing at the beacon receive window is ordered to scan repeatedly at a very low duty cycle, e.g., once a minute, to check whether the environment has changed. When it finds a beacon pulse series signal, it will lock on this one. However, it is also possible to use the following scenario. When a misaligned user enters an area with a cluster of synchronized links, he will temporarily reduce the capacity of that cluster. Nobody will synchronize to it, since its beacon pulses will be much lower than the accumulated beacon pulses of the cluster. In addition, since channels are measured before allocation takes place, users will avoid the places that the rogue user partially occupies. Only due to drift can problems occur, but these can be minimised by using a channel allocation technique that selects channels with the largest spacing to occupied channels, so called soft guard times. However, due to drift, the beacon series signal of the rogue transceiver will at one time coincide with one of the main, staggered beacon series signals. At that moment, a signal appears in the rogue transceiver's receive window, and it will finally lock on the cluster. Therefore, the higher the mutual drift, the more problems with possible collisions, but the faster the problem will disappear due to a quick lock.

The same reasoning can be held for two isolated clusters of synchronized transceivers. If these two clusters are not mutually synchronized, contention problems at the border can occur, leading to capacity drops. However, due to mutual drift, the two independent beacon series signals will at one time coincide. At that time, their respective beacon pulses add, and they will mutually synchronize.

As a result of the superposition of beacon pulses from the different transceivers, the received synchronization signal at any transceiver will be a sum of multiple, basically identical signals which essentially differ only in phase, because of the different distances and reflections the signals have experienced, and to some extent in amplitude. The synchronization signal will therefore suffer from a well-known disturbing effect called multipath or Rayleigh fading.

While adding signals like vectors, it can unfortunately occur that the vector sum turns out to be very close to zero, which means that the signal strength also becomes very close to zero, resulting in a very severe fading dip. This fading phenomenon is highly dependent on the geographical location and on the frequency; the fading dips will occur at different places for different frequencies.

The effect of the Rayleigh fading implies that the superposition of a signal with beacon pulses from a recently arrived transceiver to a beacon series signal on average will strengthen the beacon series signal, but at certain geographical points the signal will be strongly attenuated because of the occurrence of Rayleigh dips.

There are a couple of known methods to neutralize this fading effect. First, the beacon series signal can be a broadband signal. If the beacon pulse prior to the transmission is multiplied by a high rate sequence, for example a pseudo-random or pseudo-noise (PN) sequence like a Barker sequence or a maximal length sequence, Rayleigh fading will be less of a problem because the resulting signal will have a wider bandwidth. This means that even if one frequency component is highly attenuated because of a Rayleigh dip at a specific geographical location, the effect on the received signal at the same point will be limited, because only a smaller part of the signal's bandwidth will be impaired by a Rayleigh dip.

The utilization of binary sequences instead of plain pulses for the beacon pulse series signals has a further advantage. The accuracy of the arrival time of a signal depends on its autocorrelation function. The wider the autocorrelation, the bigger the uncertainty of the timing is. A narrow autocorrelation requires a large bandwidth signal with good autocorrelation properties; i.e., the autocorrelation function presents repetitive narrow pulse spikes and is otherwise equal to zero. A pseudo-random sequence is an example of a sequence with very good autocorrelation properties. In a preferred embodiment of the invention are pseudo-random sequences applied for the synchronization signal. Hereby the receivers will contain correlators which are matched to the beacon sequence. The output of the correlators provides an autocorrelation of the beacon sequence.

A second alternative to counteract the effect of Rayleigh fading is to apply antenna diversity by using two or more reception antennae placed at different locations for the will synchronize to the beacon series signal on the frequencies $f_3$ and $f_4$ in between the transmissions. If the beacon pulses on one of the frequencies can not be received because of fading, the beacon pulses on the other frequency on which that beacon series signal is transmitted, can, provided that the spacing between the two frequencies is sufficient, be received with high probability. Since the timing relationship between the two transmit instances is fixed, such synchronization to every second beacon pulse is sufficient.

It is yet possible that each beacon pulse series signal is transmitted on three or more frequencies. However, the initial scanning period increases for each additional frequency. It is furthermore possible to apply, for instance, three beacon pulse series signals for each synchronization signal. These are then preferably staggered at one third of the beacon pulse rate.

In case of using plain pulses for the synchronization signal, locking on the strongest beacon series signal gives a coarse synchronization. However, due to accumulation of slightly misaligned beacon pulses, the beacon pulse broadens which reduces accuracy if only a single edge of the beacon pulse is used for synchronization. Therefore, in an alternative embodiment of the invention, dual-edge detection of the beacon pulse is applied, which means that the transceivers synchronize exactly to the centre of the pulse. If a broadened beacon pulse, due to slight misalignment of the two beacon transmissions of different transceivers, is received at a transceiver, the contribution from that transceiver will be related to the centre of the accumulated same transceiver and choosing the best of the two received signals. This technique is, of course, not that attractive for portable applications. A third alternative is to use frequency diversity; that is, the beacon pulse series signals are transmitted sequentially at different carrier frequencies. An example of this is presented in FIG. 4 in which the synchronization signal is composed of two staggered beacon pulse series signals B1, B2. Each beacon pulse series signal is alternately transmitted on two carrier frequencies.

Figure 4:
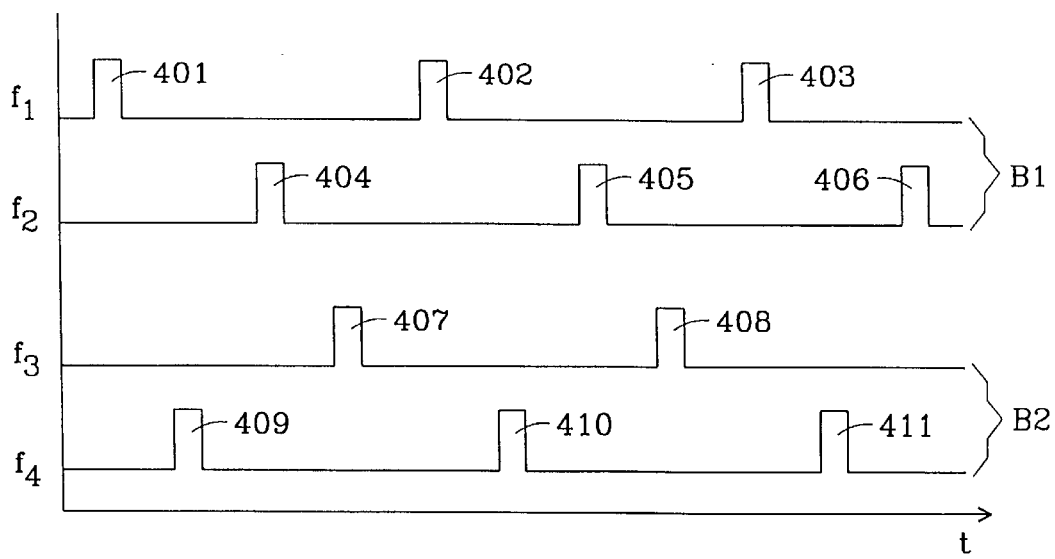
FIG. 4 is a signal diagram illustrating a synchronization signal for a mutually synchronized transceiver cluster applying frequency diversity.

Referring to FIG. 4, in which t represents the time, a first set of transceivers comprising approximately half of the transceivers in a transceiver cluster generates the beacon series signal B1. The transceivers in this first set alternately transmit their beacon pulses 401, . . . , 406 on frequencies $f_1$, and $f_2$. In between a pulse on the frequency $f_1$ and a pulse on the frequency $f_2$, they scan on a frequency $f_4$; in between a pulse on the frequency $f_2$ and a pulse on the frequency $f_1$ they scan on a frequency $f_3$. A second set of transceivers, comprising the rest of the transceivers in the transceiver cluster, synchronizes to the beacon series signal B1 and generates in the same manner the beacon series signal B2, which comprises the pulses 407, . . . , 411. In this example every transceiver contributes to the synchronization channel. As discussed, this is, however, not necessary.

An arriving unit sequentially scans all the frequencies $f_1$ to $f_4$ allocated to the synchronization signal. It then synchronizes to the strongest beacon pulse series signal; e.g., the beacon series signal on the frequency $f_3$. It will then transmit beacon pulses on the frequencies $f_1$ and $f_2$, and pulse. This has the effect on the other transceivers that they, too, are driven to the centre of the original pulse. Therefore, dual-edge detection provides a method to force the beacon pulse transmissions to an exact location in time, obtaining exact alignment. Phase locking loop circuits applying dual-edge detection are per se prior art. Those skilled in the art of circuitry will also be aware of other ways of implementing a dual-edge detector.

When the transceivers are synchronized with the method described above, an orthogonal channel allocation scheme can be implemented. A channel can, e.g., be a TDMA time slot or a slot-hop combination. Since no master control unit is present in an ad-hoc network to allocate channels, an adaptive allocation scheme must be used in which the condition of each channel is monitored before an allocation is made. This can be referred to as SSMA (Slot Sense Multiple Access) in contrast to CSMA (Carrier Sense Multiple Access).

Firstly, the synchronization signal can be used to define a multiframe in which all channels are situated. The number of channels depends on the required frame rate and the number of channels per frame. The latter depends on the duration of a single time slot, the acceptable overlap, or the required guard time. In the embodiment of the invention illustrated in FIG. 5, it is assumed that all links apply the same channel format once the beacon series have been defined. As long as the signal fits within the bandwidth of the common air interface, and as long as the burst does not exceed the allocated time slots, it is immaterial what kind of modulation technique or bit transmission rate are used in each individual link. Under these conditions, the links may have quite different characteristics.

Figure 5:
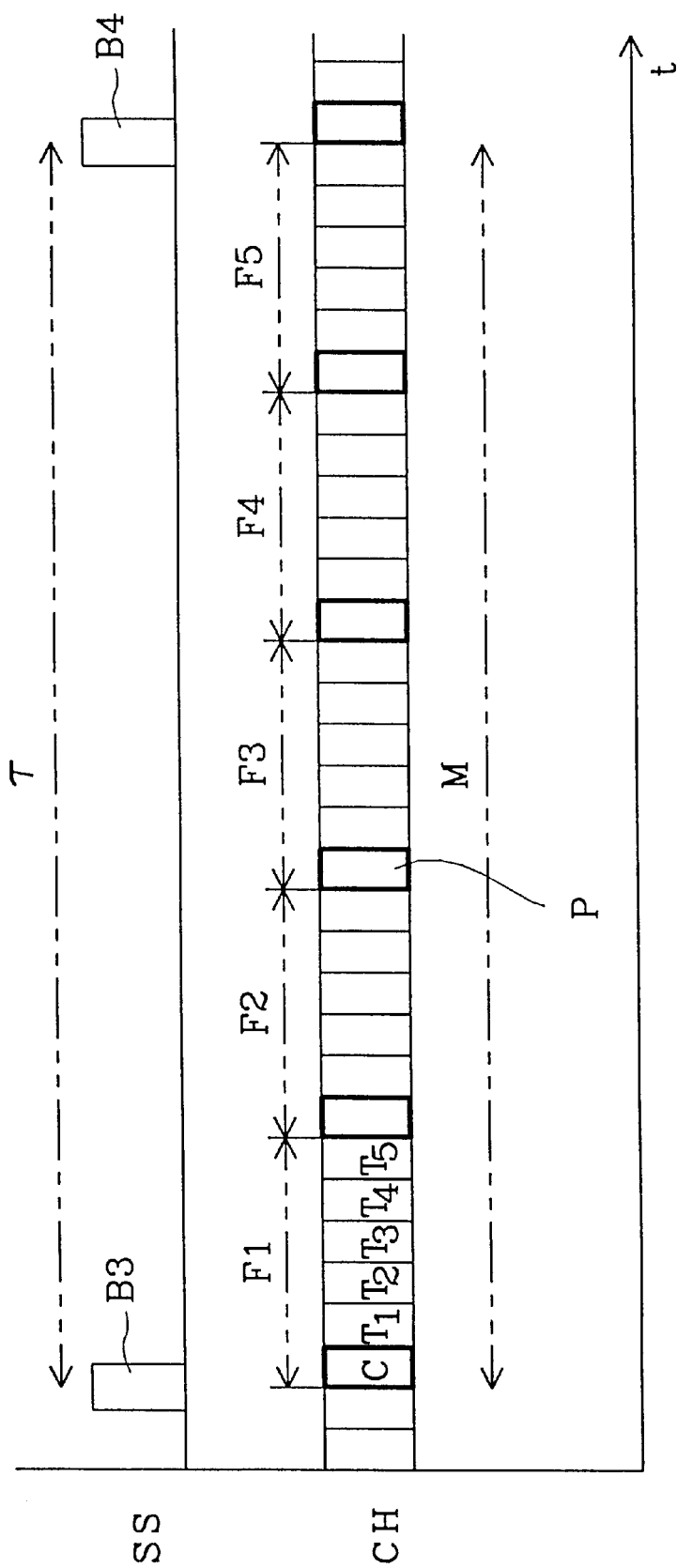
FIG. 5 is a signal diagram illustrating a TDMA channel allocation scheme.

In FIG. 5, an example of a TDMA channel allocation scheme is shown. In FIG. 5, t represents the time. A synchronization signal SS, comprising beacon pulses from two staggered beacon series signals B3 and B4, gives the reference to the definition of TDMA channels CH. A multiframe M comprising a number of frames F1, . . . , F5 is placed within the time period τ between two adjacent beacon pulses on the synchronization signal SS. The frames are divided into time slots. Each frame comprises a control channel C and a number of traffic channels $T_1, \ldots, T_5$.

Once a channel format has been defined, one or more slots in a frame or multiframe can be defined as control channels.

The control channel has a number of functions. First, it is the location where paging messages can be placed, e.g., to set up a call. Therefore, an idle unit only has to wake up during the control time slot to check for pages. In addition, it occasionally has to wake up during a beacon pulse to restore synchronization. The unit does not have to wake up during each control slot, but, for example, at a few specific control slot locations within the multiframe. The transceiver arrangements should preferably randomly choose the control slots for paging so that not every transceiver arrangement tries to set up a call each time at the same control slot within the multiframe. In FIG. 5 the multiframe M is divided into the five frames F1, . . . , F5, each consisting of six time slots. These are just arbitrary numbers in the embodiment; usually the number of frames per multiframe will be much larger. The first slot of every frame F1, . . . , F5 is reserved as the control channel C; the remaining five are the traffic channels $T_1, \ldots, T_5$. The users on one link have, for example, determined that only the third control slot within the multiframe can be used for paging. This slot is the paging slot P. Therefore, only during that slot P do said transceivers have to wake up to check for pages.

Apart from paging, the control channel C is used to handle the traffic channel allocation. Once a page is recognised, consecutive control slots can be used to convey more information regarding channel set-up, etc. The control channel C then acts like a screen to the underlying traffic channels. Only through the control channel can an allocation of a traffic channel be made. As long as the control channel is occupied, no other user is allowed to transmit a page or call set-up request message on the control channel, but has to wait until its paging slot becomes empty. During a link set-up, the control slots are continuously used to prevent other users from an access attempt. During this time the two transceivers in the transceiver arrangement in question measure on traffic slots and create a priority list with preferred channels, i.e., on which traffic channels the least amount of interference is measured. One of these lists is then transferred over the control channel to the other party, which combines the lists and selects in this embodiment a duplex link, consisting of two channels, i.e., time slots. In this decision, the time spacing to occupied traffic channels can be incorporated to provide as much guard time as possible. Once made, the decision is conveyed to the other party over the control channel. Then the traffic starts on the selected traffic slots, and the control channel C is released. At that moment, another user can start a channel allocation process, but will avoid using the traffic channels just allocated since it will measure traffic on them. In this example the number of the transceivers in the transceiver arrangement is two. The allocation method is, however, also applicable for transceiver arrangements with three or more transceivers.

The traffic channel C can be released after an entire speech session has been completed, after a single data package has been sent, or after an entire data session has been completed. As long as a channel must be maintained, transmission must be present to prevent other users from taking this channel. This requires the insertion of dummy bursts in case no data is present.

During a link session, control information can be conveyed through the traffic channel, or a flag can be inserted in the traffic to signal to the receiver to check on the control channel again. In this way, extra traffic channels can be allocated, or short data messages can be conveyed over the control channel without affecting the current link session.

In the description above, a Time Division Duplex (TDD) scheme was assumed. This scheme is appropriate for short-range applications of the type shown in FIG. 1. The transceivers are on an equal level, so an up-link or down-link as in cellular communication systems is difficult to define. Moreover, in one case a unit might be regarded as a master unit (the "master" portable phone 1 talks to the "slave" PDA 3), whereas in another case it is regarded as a slave unit (the "slave" portable phone 1 talks to the "master" home base station 2). Since there are necessarily not any specific master or slave transceivers in the envisioned environment, every unit should preferably be able to communicate with every other unit. Then TDD with a free choice of duplex slots is the preferred embodiment. However, it is possible to use Frequency Division Duplex (FDD) as well. The invention is, of course, not restricted to only these cases. Firstly, the invention provides a general method for synchronization of radio communication links. As discussed above, synchronization is requested in many different contexts apart from TDMA systems. Examples of systems are slotted ALOHA and FDMA with TDD. Furthermore, in a TDMA channel scheme as in FIG. 5, every transceiver arrangement communicating over a link can within the time slot or set of time slots which it has allocated to itself, transmit speech, data or both with an arbitrary bit rate and type of modulation. The only restriction hereby, as long as the time limits of the time slots are not exceeded, is the maximal bandwidth allowed.

If a synchronization area in which all transceiver arrangements are mutually synchronized is large, a situation may occur in which signals from a first transceiver arrangement in one corner of the synchronization area will be undetected by a second transceiver arrangement in another corner of the synchronization area because of low signal strength. Since the channel allocation is based on measurements on the signal strength in different time slots, the second transceiver arrangement might allocate a time slot which is used by the first transceiver arrangement. This can be advantageous, since it provides channel reuse within the cluster and it means that the synchronization clusters theoretically can be unlimited in both geographical extension and number of transceiver arrangements. However, if two transceiver arrangements using the same time slot approach each other, interference leading to a severe dip in transmission quality might occur. This problem can, in most applications, be solved by channel reallocation. If a number of time slots in a row are misinterpreted by a receiving transceiver in a transceiver arrangement, the transceivers in the transceiver arrangement negotiate over the control channel for selection of a new time slot or set of time slots to use for speech or data transmission.

Figure 6:
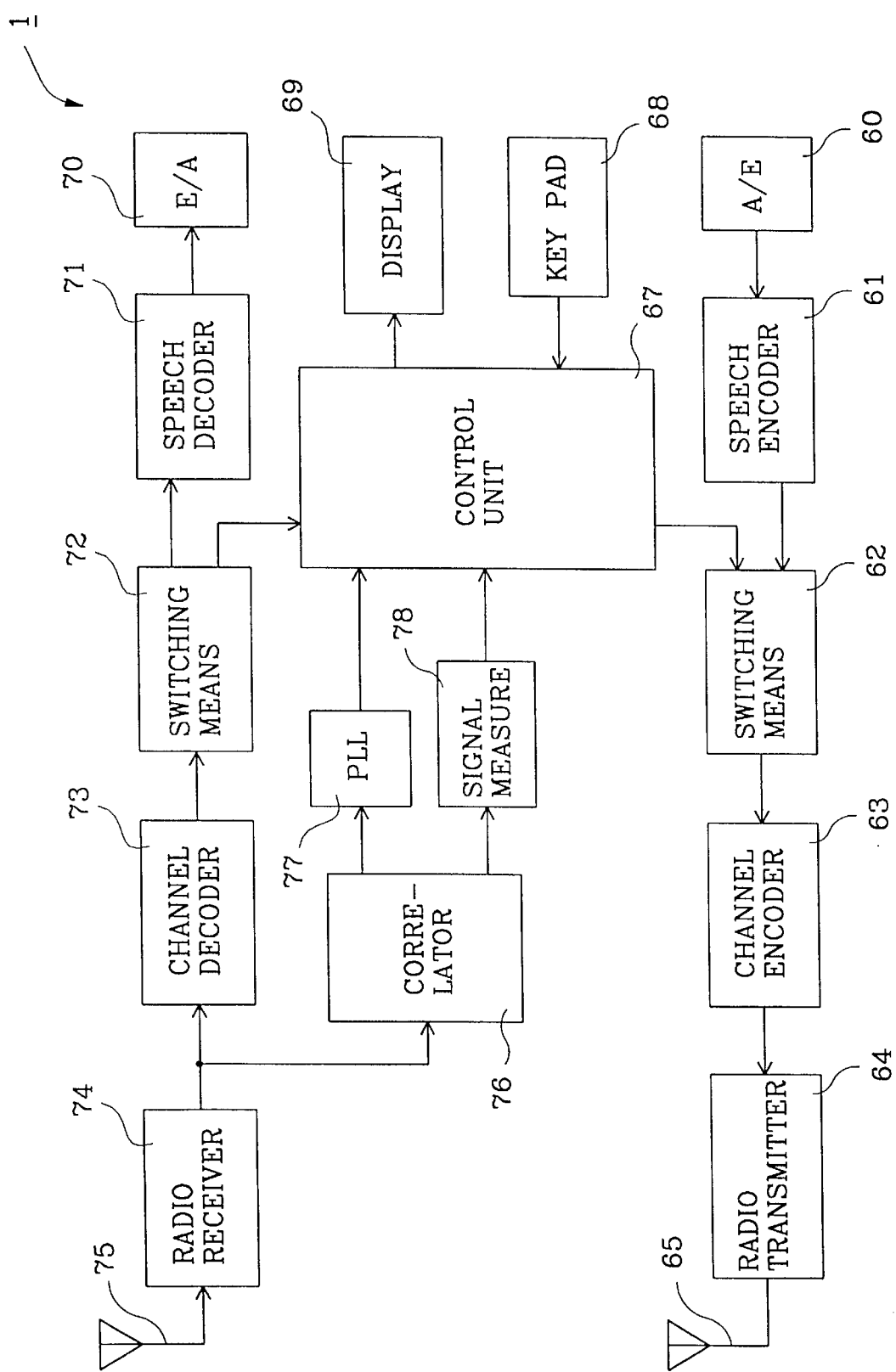
FIG. 6 is a simplified block diagram of a portable telephone.

A simplified block diagram of the portable telephone 2 in FIG. 1 is illustrated in FIG. 6. This portable telephone is intended for speech and data transmission. It includes a acousto-electric (A/E) converter 60 coupled to a speech encoder 61, which digitalizes speech information from the microphone 60. Via a first switching means 62 the speech encoder 61 is connected to a channel encoder 63. The channel encoder is connected to a radio transmitter 64. The transmitter is connected to an antenna 65.

A radio receiver 74 is connected to an antenna 75, which may be identical with the antenna 65. The receiver is connected to a channel decoder 73, which is connected to a speech decoder 71 via a second switching means 72. The speech decoder 71 is connected to a sound reproduction means in form of an electro-acoustic (E/A) converter 70 and decodes digital information into analogue sound information.

A control unit 67 has a first data input connected to a key pad 68 and a first data output connected to the first switching means 62. The unit 67 further has a second data input connected to the second switching means 72, and a second data output connected to a display 69. In addition, the control unit has control outputs which are not shown in the figure.

A signal correlator 76 is connected to a means 78 for signal strength measurement, to the radio receiver 74 and to a timing circuit 77 constituted by a phase locking loop (PLL) circuit. The PLL circuit and the means for signal strength measurement 78 are connected to the control unit 67.

Via its control outputs the control unit 67 can control the transmitter 64 and receiver 74, inter alia, for selection of traffic channel. In addition, the control unit can actuate the switching means via its control outputs so that the means transmit and receive either speech information or other kind of data.

Upon start-up, the portable telephone tunes its radio receiver 74 to a frequency on which beacon pulses, which are coded with a PN sequence, can be transmitted. The output signal from the radio receiver 74 is analysed by the correlator 76. The correlator is matched to the PN sequence so that the correlator produces a spike for each beacon pulse that is coded with the matching PN sequence. The output signal from the correlator is measured with the means for signal strength measurements 76 over a time period corresponding to two periods of the rest frequency signal in the PLL circuit 77, whereupon the result is analysed by the control unit 67. This procedure is repeated for each frequency allocated for the synchronization signal. By evaluating the results of the time scans, the control unit can determine which beacon pulse series signal available, if any, is the strongest. If no beacon series signal to which the transceiver can synchronize could be found, the transceiver starts transmitting controlled by the PLL circuit 77 without synchronization.

If the presence of a synchronization signal, however, could be established, a time window around the pulses of the strongest available beacon series signal is opened under supervision of the control unit 67. The PLL circuit 77 then receives a signal to which it can synchronize. If the transceiver is supposed to be active, that is, if it is intended to transmit beacon pulses, it starts doing so controlled by the PLL circuit 77.

In transmitting speech from the portable telephone to, for example, a home base station (HBS), the speech is digitalized in the speech encoder 61 before transmission. The digital signals representing speech are taken via the first switching means 62 to the channel encoder 63, where they are coded for transmission on a radio traffic channel, using an error-correcting code extending over three or more successive time slots allocated to the portable station. The transmitter modulates the digital signals and transmits them at high speed during a time slot under the control of control signals from the control unit.

In transmitting speech from a transceiver to the portable telephone on a radio traffic channel, digital signals are received in the radio receiver 74 at high speed in a time slot under the control of signals from the control unit 67. The digital signals are demodulated and taken from the receiver 74 to the channel decoder 73, where error-correcting decoding takes place, which is in principle an inversion of the encoding which took place in the channel encoder 63. The digital signals from the channel decoder 73 are supplied to the speech decoder 71 via the second switching means 72. The digital information from the switching means is decoded in the speech decoder to analogue sound information.

Figure 8:
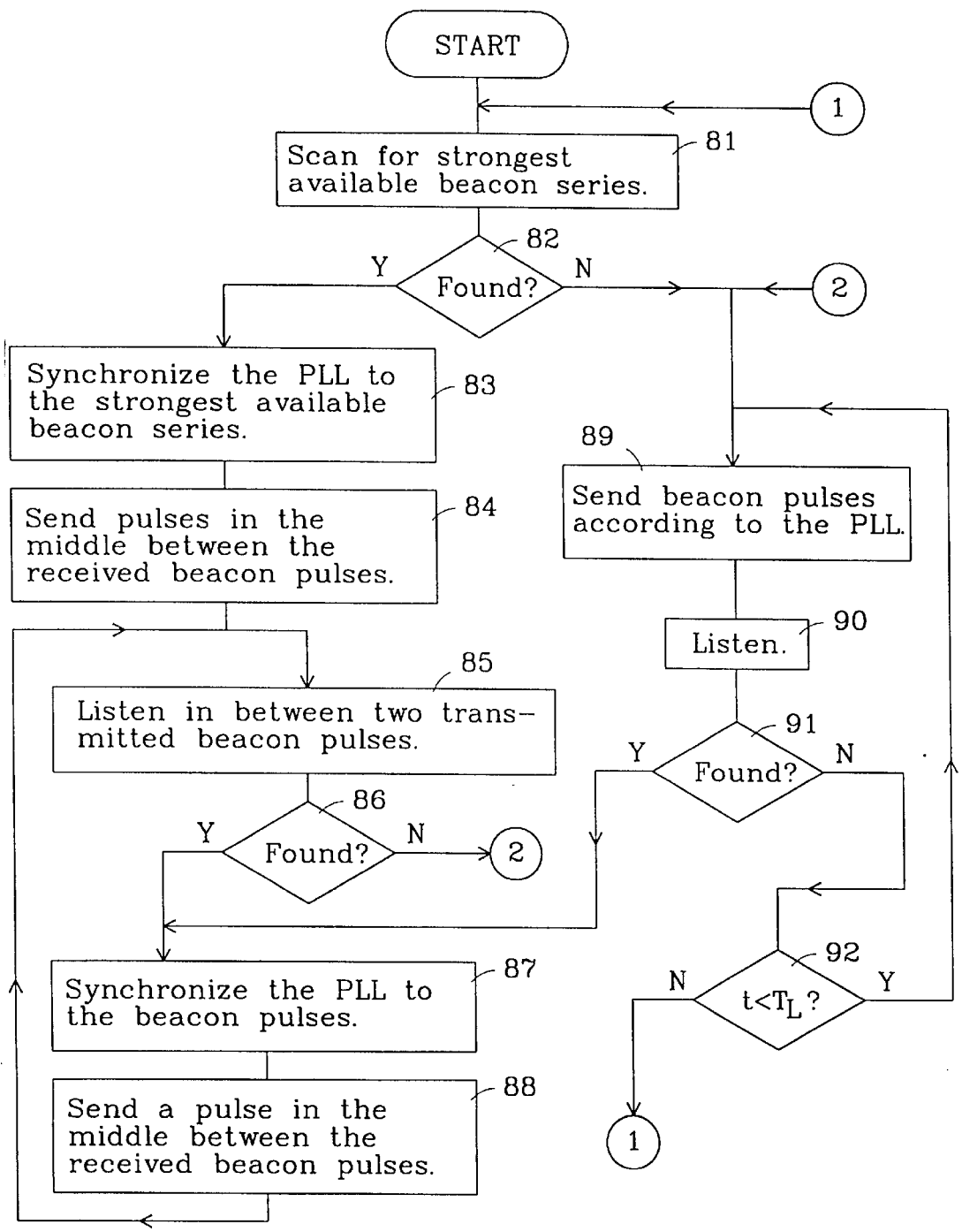
FIG. 8 is a flow diagram illustrating a procedure for obtaining orthogonal channels according to an embodiment of the present invention.

The synchronization procedure of the portable telephone 1 is further illustrated in the flow diagram in FIG. 8, in which Y represents an affirmative alternative and N represents a non-affirmative alternative. Upon start-up, a step 81 is performed in which the radio receiver, which is denoted 74 in FIG. 6, is tuned to a frequency on which beacon pulses, which are coded with a PN sequence, can be transmitted. By performing an autocorrelation of the received signal with a correlator matched to the PN sequence, a spike is produced for every beacon pulse that is coded with the specific PN sequence. The signal strength of the resulting signal is analysed over a time period corresponding to two periods of the rest frequency signal of the PLL circuit, which is denoted 77 in FIG. 6. This procedure is repeated for each frequency allocated to the synchronization signal.

In a step 82, the results of the time scans are analysed. If the presence of a beacon pulse series signal can be established, the PLL circuit is induced, as illustrated in a step 83, to synchronize to the strongest available beacon series signal. When the transceiver is synchronized, it sends in step 84 beacon pulses exactly in the middle between the received beacon pulses.

In a step 85, the transceiver listens in a time window during which a received beacon pulse is expected to be found. If the presence of a pulse can be established in a step 86, the PLL circuit is, as illustrated in step 87, induced to take the location of the pulse into account.

In a step 88, the transceiver transmits a beacon pulse, in accordance with the synchronized output signal from the PLL circuit, in the middle between two received beacon pulses. After the fulfilling of the step 88, the execution of the method continues with the step 85.

If no beacon pulse series signal could be found in the step 82, or if no beacon pulse was found in the step 86, a step 89 is performed in which beacon pulses are transmitted according to the output signal from the PLL.

In a step 90, a time window is opened in the middle between two transmitted beacon pulses. In a step 91, the presence of a beacon pulse during the time window is determined. If the presence of a pulse can be established, the execution of the method continues with the step 87. If, however, no pulse is found, the execution of the method continues with the step 89. However, if the steps 89, 90, and 91 continuously have been repeated, that is, the transceiver has been transmitting beacon pulses without an external synchronization, during a time period that is greater than or equal to a time constant $T_L$, the execution of the method continues with the step 81. The decision if the time constant $T_L$ is reached, is taken in a step 92.

By restarting with the step 81, the transceiver scans for a previously undetected beacon pulse series signal to which the transceiver can synchronize. As discussed, this procedure is, however, not necessary. Thanks to the mutual drift of two unsynchronized beacon series signals, the series will eventually coincide. At this time, the transceivers will mutually synchronize without taking any extra measures for this.

In this embodiment, the transceiver continues to listen to every received beacon pulse after the transceiver has been synchronized. It is, however, not necessary to wake up and listen to every beacon pulse and correct for any misalignment that may occur. For a synchronized transceiver, it is sufficient to wake up at a lower frequency and listen to only a smaller part of the beacon pulses in a beacon series signal.

Figure 7:
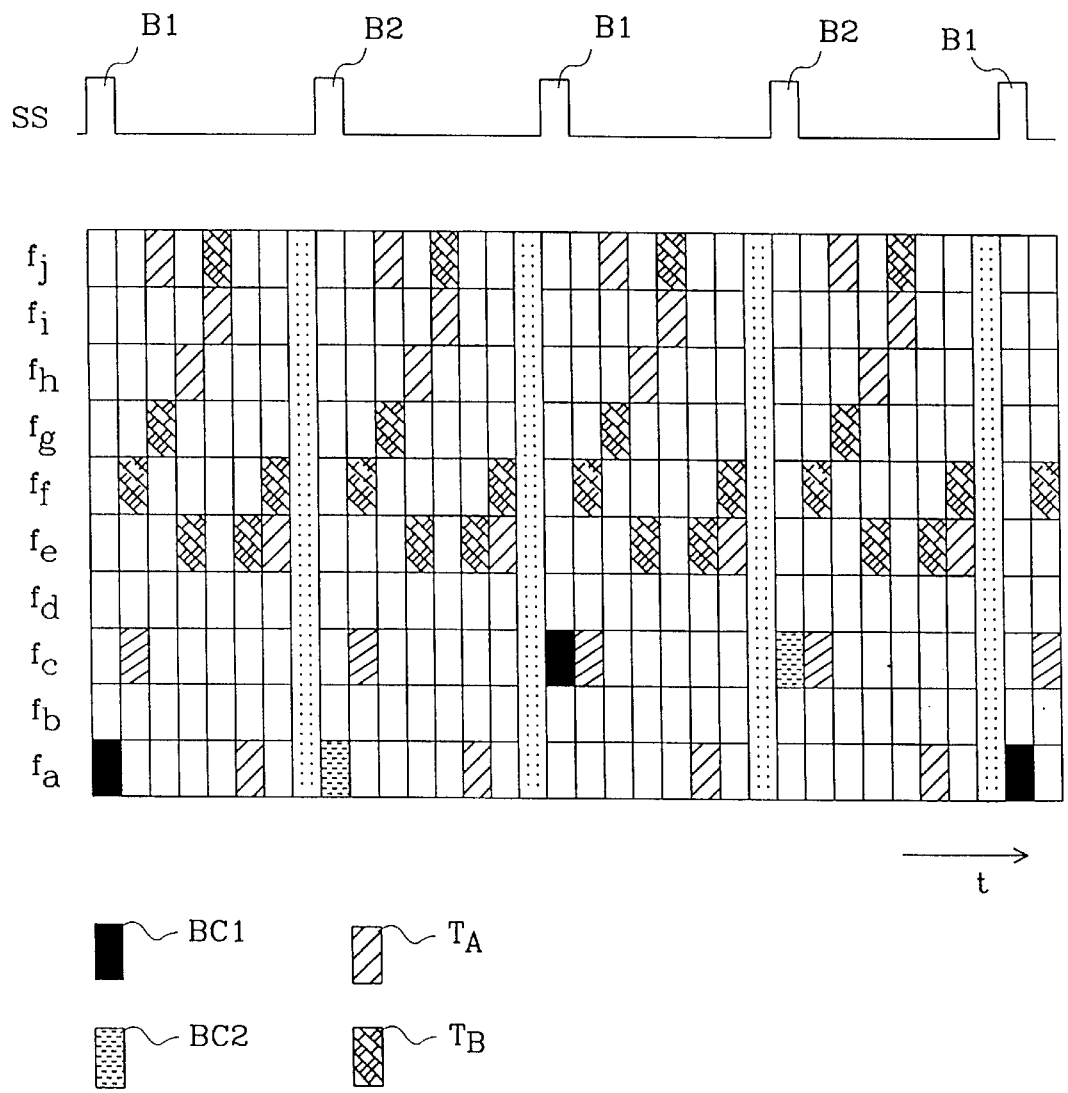
FIG. 7 is a time-frequency diagram illustrating a channel allocation scheme for frequency-hopping transmitters with orthogonal hopping sequences.

In the example illustrated in FIG. 4, a system applying frequency hopping for the synchronization signal was shown. Frequency hopping can, however, also be applied for the traffic channels. Such a system is called FH-CDMA. In a FH-CDMA system, time slots are defined based on the beacon repetition rate in the same manner as in the embodiment illustrated in FIG. 5. An example of a time-frequency diagram for frequency hopping is shown in FIG. 7. Referring to FIG. 7, in which t represents the time, a synchronization signal SS is composed of two staggered beacon pulse series signals B1 and B2. The beacon series signal B1 is transmitted on a beacon channel BC1, and the beacon series signal B2 is transmitted on a beacon channel BC2. Each beacon channel jumps between two carrier frequencies $f_a$ and $f_c$, so that the beacon series signals B1 and B2 are transmitted alternately on these two frequencies. The two frequencies $f_a$ and $f_c$ together with eight other frequencies $f_b$, $f_d$, . . . , $f_j$ are also used for traffic channels. Two of these traffic channels $T_A$ and $T_B$ are shown in the figure. The time between two beacon pulses is, in this example, divided into a large number of time slots of which the first seven are shown in the figure. The number of frequencies shown in FIG. 7 is just an arbitrary figure. Normally the number of frequencies is larger.

For the hopping sequences, PN sequences are used. These sequences are repeated after every beacon pulse. If the PN sequences of different traffic channels are orthogonal, and all transceivers are mutually synchronized, no collisions will occur.

When a new-coming transceiver pair wishes to set up a connection in an existing FH-CDMA ad-hoc network, the transceivers will first synchronize to the synchronization signal SS, whereupon they scan the frequencies for traffic during every first time slot after a beacon pulse. The traffic channels are all mutually orthogonal. This means that it theoretically is enough to know the frequency location of a traffic channel during one time slot to determine the entire hopping sequence of that traffic channel. However, every first time slot of occupied traffic channels may also contain information of the specific hopping sequence applied. By these means, the new-coming transceiver pair will be able to select a free hopping sequence and establish a CDMA connection.

The traffic channels use the frequencies $f_a$ and $f_c$ allocated to the synchronization signal SS. This means that speech and data traffic theoretically could affect the synchronization. Correct synchronization of the transceivers will, however, still be accomplished, since each transceiver contains a correlator which is matched to the pseudo-random sequence of the beacon pulses, and will therefore only with small probability respond to random data sequences.

Figure 9:
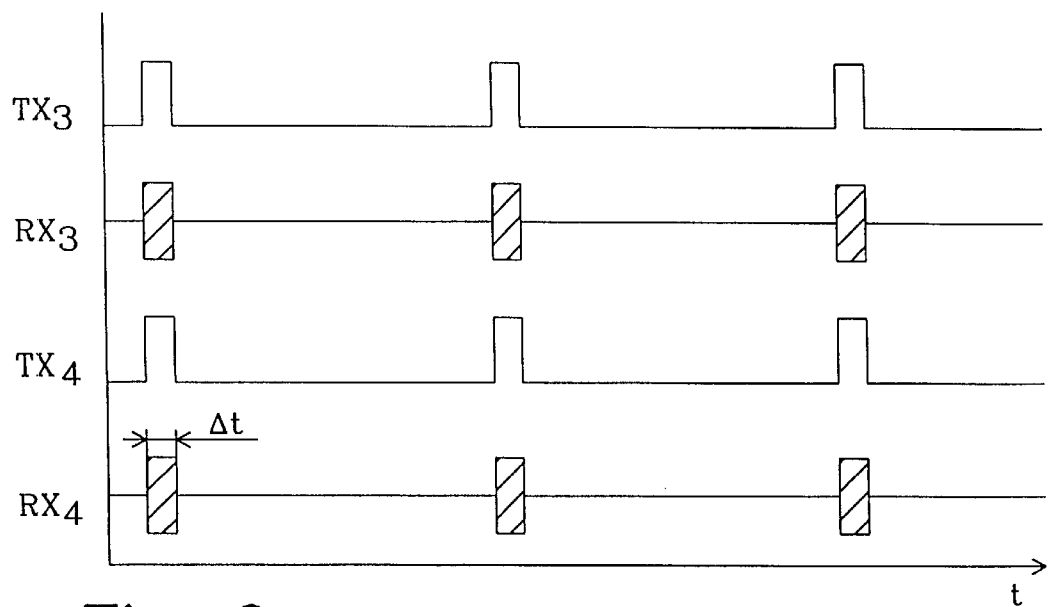
FIG. 9 is a signal diagram illustrating an alternative embodiment in relation to the embodiment in FIG. 2.

As discussed, the beacon pulse series signals should preferably be staggered. This way, the active transceivers do not have to listen for beacon pulses and transmit others at the same time. It is, however, possible to have the two series mutually synchronized, as illustrated in FIG. 9, so that the active transceivers receive and transmit beacon pulses simultaneously, if the pulses from two beacon pulse series signals are coded with two different orthogonal codes. These codes can preferably be PN codes.

In FIG. 9, t represents the time and $\Delta t$ the duration of a time window. $TX_3$ and $TX_4$ are two beacon pulse series signals, with identical repetition rate, which together constitute a synchronisation signal. The transceivers synchronize their internal timers which control the signal transmission from the transceivers to the strongest one of the two beacon pulse series signals $TX_3$, $TX_4$ by listening during one of the corresponding sets of time windows $RX_3$, $RX_4$.

In this embodiment of the invention, each transceiver is equipped with parallelly arranged correlators. Each correlator is matched to one of the PN sequences by which the beacon pulses are coded. In order to suppress crosstalk between the output and the input in a transceiver, a first beacon pulse from the received beacon series signal to which the transceiver synchronizes and a second beacon pulse that is transmitted from the transceiver at the same time as the first beacon pulse is received, are preferably transmitted on two separate carrier frequencies. By these means, the transceivers are able to select the strongest available beacon pulse series signal by, sequentially using the different correlators, scanning the frequencies on which beacon pulse series signals can be transmitted and analysing the result.

I claim:

1. A method of synchronizing a plurality of peer radio transceivers comprising the steps of:

arranging the plurality of transceivers which use a common air interface into a number of transceiver arrangements with each transceiver arrangement comprising at least two transceivers communicating via a radio link;

establishing a common synchronization signal among the transceivers, the signal being formed by superposed beacon pulses and having at least two parts; and synchronizing a transceiver in a transceiver arrangement to one of said synchronization signal parts, the synchronized transceiver then contributing to another of said synchronization parts.

2. A method according to claim 1, wherein a transceiver synchronizes to one of said synchronization signals parts while not contributing to other synchronization signal parts.

3. A method according to claim 1, wherein at least one transceiver in at least a number of said transceiver arrangements contributes to the generation of at least one of said beacon pulse series signals which is not identical to another of said beacon pulse series signal.

4. A method according to claim 1, wherein the transceivers in each transceiver arrangement exchange at least one of speech and data over short-range radio transmission links.

5. A method according to claim 1, wherein the transceivers transmit at least one of speech and data in time slots that are aligned to said synchronization signal.

6. A method according to claim 5, wherein the transceivers apply burst transmission in said time slots.

7. A method according to claim 1, wherein each beacon pulse series signal is transmitted in an alternating manner on at least two separate carrier frequencies.

8. A method according to claim 1, wherein each beacon pulse series signal comprises a series of pulses each of which further comprises a binary sequence.

9. A method according to claim 8, wherein all pulses on a beacon pulse series signal comprise substantially identical binary sequences which are mutually orthogonal to the binary sequences of different beacon pulse series signals.

10. A method according to claim 1, wherein each transceiver comprises an internal timing circuit for controlling the transmission and reception of signals in the transceiver and wherein further the internal timing circuit of each transceiver is synchronized to the beacon pulse series signal having the highest signal strength.

11. A method according to claim 1, wherein the synchronization signal comprises two staggered beacon pulse series signals having identical repetition periods.

12. A method according to claim 11, wherein the two beacon pulse series signals are shifted in relation to each other by one half of the time period between two adjacent pulses on a beacon pulse series signal.

13. A method according to claim 12, wherein at least one transceiver in at least a number of the transceiver arrangements contributes to the generation of the synchronization signal by transmitting a beacon pulse between two received beacon pulses in the beacon pulse series signal to which the transceiver synchronizes.

14. A method of obtaining orthogonal radio channels in a network having multiple transceiver arrangements with each arrangement comprising at least two transceivers communicating via a radio link, said method comprising the steps of:

synchronizing each transceiver to a common synchronization signal;

defining time slots by dividing a time scale into intervals; and allocating time slots for each radio link wherein at least one transceiver of said transceiver arrangement is induced to transmit beacon pulses according to a corresponding internal timer during a transmitting step wherein the beacon pulses are superposed so that they form beacon pulse series signals which are superposed to form the synchronization signal.

15. A method according to claim 14, wherein the transceiver arrangements form an ad-hoc network.

16. A method according to claim 14, wherein a plurality of previously unsynchronized transceivers synchronize to the network by scanning for beacon pulse series signals and locking on to the strongest one of the signals.

17. A method according to claim 16, wherein each beacon pulse series signal comprises a series of beacon pulses and the previously unsynchronized transceivers that contribute to the generation of the synchronization signal transmit beacon pulses between received beacon pulses in the beacon pulse series signals to which the individual transceivers are locked.

18. A method according to claim 14, wherein the time slots are defined with reference to a timing of the beacon pulses.

19. A method according to claim 14, wherein the transceivers in a transceiver arrangement allocate a set of time slots for at least one of speech and data transmission by measuring a signal level on time slots available for at least one of speech and data traffic and selecting the set of time slots while avoiding time slots on which traffic is observed.

20. A method according to claim 14, wherein the radio links are short range radio links resulting in a ratio of the propagation delay of each link is less than a duration of the time slots.

21. A synchronization apparatus comprising a plurality of transceiver arrangements each comprised of at least two peer transceivers communicating via a radio link wherein the transceiver arrangements use a common air interface and lock to one part of a common synchronization signal while contributing to at least one other part of said common synchronization signal, the common synchronization signal being formed by superposed beacon pulses.

22. An apparatus according to claim 21, wherein the transceivers in each transceiver arrangement are arranged to exchange at least one of speech and data over short-range radio transmission links.

23. An apparatus according to claim 21, wherein the transceivers apply burst transmission.

24. An apparatus according to claim 21, wherein the beacon pulse series signals have identical repetition periods and are arranged to avoid coincidence of the respective beacon pulses.

25. An apparatus according to claim 21, wherein each beacon pulse series signal is transmitted alternately on at least two separate carrier frequencies.

26. An apparatus according to claim 21, wherein each pulse comprises a binary sequence.

27. An apparatus according to claim 26, wherein all pulses on a beacon pulse series signal comprise substantially identical binary sequences which are mutually orthogonal to the binary sequences of different beacon pulse series signals.

28. An apparatus according to claim 21 wherein each transceiver comprises an internal timing circuit for controlling the transmission and reception of signals in the transceiver and wherein further the internal timing circuit of each transceiver is synchronized to the beacon pulse series signal having the highest signal strength.

29. A method for synchronizing a transceiver arrangement in a radio network wherein the transceiver arrangement comprises at least two transceivers communicating via a radio link and each transceiver comprises an internal timer, said method comprising:
    a scanning step in which each transceiver is induced to scan for a first synchronization signal segment;
    a synchronization step in which each of said transceivers is induced to synchronize a corresponding internal timer to said strongest available synchronization signal; and
    a transmitting step in which at least one transceiver of said transceiver arrangement is induced to transmit a second synchronization signal segment, different from said first synchronization signal segment, according to a corresponding internal timer wherein the second synchronization signal segment contributes to a common synchronization signal, the common synchronization signal being formed by superposed beacon pulses.

30. A method according to claim 29, wherein the transceivers in the transceiver arrangement exchange at least one of speech and data over short-range radio transmission links.

31. A method according to claim 29, wherein the beacon pulse series signals are staggered.

32. The method of claim 29 wherein the first synchronization signal segment is the strongest available synchronization signal segment.

33. The method of claim 29 the second synchronization signal segment is the weakest available synchronization signal segment.

34. A method for synchronizing a transceiver arrangement in a radio network wherein the arrangement comprises at least two transceivers communicating via a radio link and each transceiver comprises an internal timer, the method comprising:
    a scanning step, in which each transceiver is induced to scan for a strongest available synchronization signal; and
    a synchronization step, in which each of said transceivers by which the presence of said strongest available synchronization signal can be established, is induced to synchronize a corresponding internal timer to said strongest available synchronization signal wherein the synchronization signal comprises at least two beacon pulse series signals each comprising a superposition of beacon pulses generated by at least two radio transceivers.

* * * * *